Jan. 14, 1930. J. N. NELSON 1,743,796
OPHTHALMIC MOUNTING
Filed Nov. 17, 1927
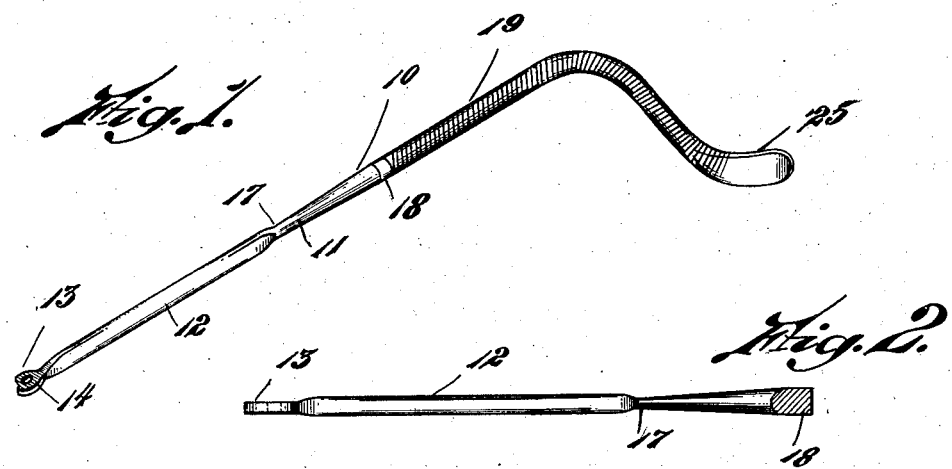
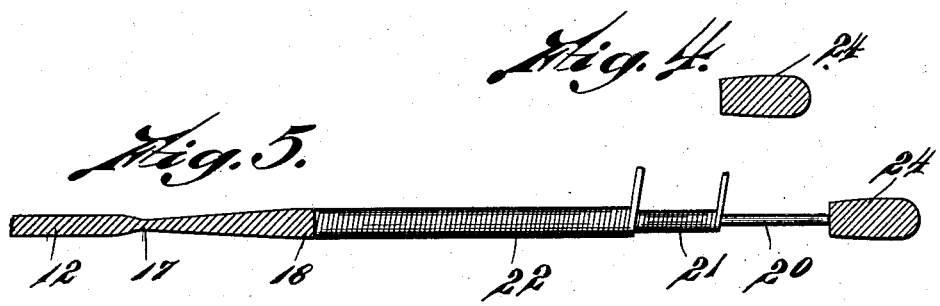
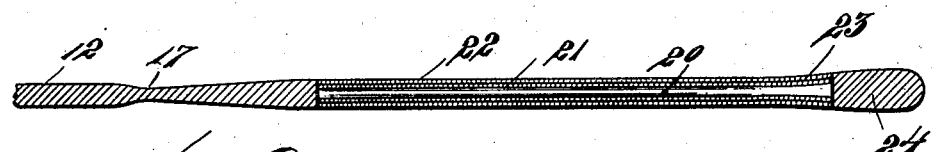
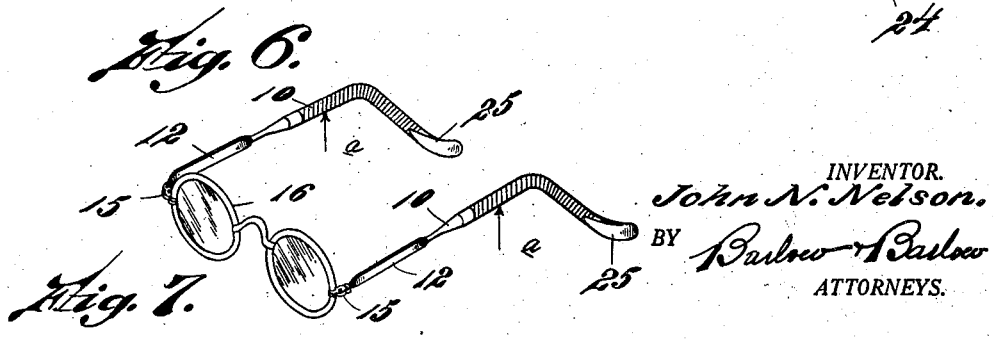
INVENTOR.
John N. Nelson.
BY Barlow & Barlow
ATTORNEYS.

Patented Jan. 14, 1930

1,743,796

UNITED STATES PATENT OFFICE

JOHN N. NELSON, OF PROVIDENCE, RHODE ISLAND, ASSIGNOR TO UNIVERSAL OPTICAL CORPORATION, OF PROVIDENCE, RHODE ISLAND, A CORPORATION OF RHODE ISLAND

OPHTHALMIC MOUNTING

Application filed November 17, 1927. Serial No. 233,771.

This invention relates to an improved construction of ophthalmic mounting and the temple members attached thereto; and one object of this invention is to provide an ophthalmic mounting with temple members each having its rear end or half of a weight substantially greater than that of its forward half so as to in a measure balance the weight of the lens frame to which the forward portions of the temples are attached.

A further object of the invention is to enlarge the rear half or portion of the temple member to increase the weight of this portion relative to the weight of its forward portion to counterbalance in a measure the weight of the frame; also to increase the size of the rear portions of the temples to prevent abrading of the tender skin above the ear and be more comfortable to the wearer.

The invention further consists in enlarging the rear portion of the temple by helically winding a bendable core along its length with one or more layers of wire forming a so-called cable construction and to form the core of the bendable material so that it will be retained in any desired bent shape to better fit the head of the wearer.

The invention further consists in the construction of this temple member in three parts, the forward part being formed with a resilent blade portion and hardened, the intermediate or shank portion being provided with a bendable core wound with one or more layers of wire to provide a cable construction, the forward end of the core and winding being soldered to the rear end of the forward part and a tip member being soldered to the rear end of the core and its winding to secure the ends of the winding in position.

With these and other objects in view, the invention consists of certain novel features of construction, as will be more fully described, and particularly pointed out in the appended claims.

In the accompanying drawings:

Fig. 1 is a perspective view of my improved temple.

Fig. 2 is a view of the forward part of the temple.

Fig. 3 is a view of the shank portion of the temple.

Fig. 4 is a sectional view of the tip end member of the temple.

Fig. 5 is a view partially in section showing a portion of the front part and showing the two separate windings on the core of the shank portion, the tip being shown in section.

Fig. 6 is a sectional view of the intermediate portion showing the winding on the intermediate or shank section with the forward end with its winding soldered to the rear end of the front part and the rear end of the shank section soldered to the tip member of the shank.

Fig. 7 is a perspective view showing my improved temple members as secured to the light weight lens frame, the rear ends of the temples being enlarged and heavier than the forward ends of the temples where secured to the frame.

It is found in practice of advantage in some instances to provide an ophthalmic mounting which is somewhat balanced, that is, so that the weight at the rear ends of the temples will approximate that of the lens frame to which the forward ends are attached so that when the mounting is in position on the face of the wearer, that portion of the temples which extends back of the ears is heavier than the forward portion or half of the temple so that when fulcrumed on the ears this rear portion serves in a measure to counterbalance the weight of the lens frames to which the forward ends of the temple are attached and so give the effect of a light weight frame which rests lightly on the face of the wearer. To obtain this balanced effect, I form the shank portion of the temple with a core on which is helically wound one or a plurality of layers of wire which builds up the size of the temple, rendering it less liable to abrade or injure the delicate skin over the ears, when in position; also it provides a readily bendable cable effect, the core being of a pliable nature permits this end of the temple to be bent into the desired shape to properly engage and conform to the skull of the wearer; also by this construction I solder the forward end of the shank portion with its windings to the rear end of the forward portion and solder the rear end of the shank portion with its winding to the forward end of the tip end member to firmly secure the core ends of the windings thereon to the tip firmly retaining the whole in position.

After the ends of this intermediate section are soldered in position the tip with the rear portion of this shank portion is struck and flattened to permit it to be more readily passed thru the hair of the wearer which is of advantage particularly where the hair is long as worn by women; and the following is a detailed description of the present embodiment of the invention and showing one construction of temple by which these advantageous results may be accomplished:—

With reference to the drawings, 10 designates the temple member which by my improved construction is formed in three separate parts, the forward part 11 which is first struck to flatten the portion 12 to form a resilient blade portion which will readily yield laterally to conform to the face of the wearer, the forward extremity of this blade portion having a flattened lug 13 pierced at 14 to be pivoted to the ends 15 of the lens frame 16. To the rear of this flattened blade 12 the stock has a reduced neck portion 17 which tapers up rearwardly to the enlarged end 18 which is of a diameter substantially that of the periphery of the wire wound shank portion 19. This shank portion is preferably constructed separate from the forward or butt portion of the temple and comprises a core 20 formed of a relatively soft bendable metal and on this core is helically wound a layer of wire 21 and in other instances a second layer of wire 22 is wound upon the first layer, the ends of these wire coils being soldered with the end of the core to the rear end 18 of the forward part, while to the rear end 23 of this core and shank portion is soldered a tip member 24 to also secure the extremities of the coils about the core 20. The next operation is to strike this tip member 24 together with a portion of the wound portion to flatten the tip as at 25, thereby permitting it to be more readily passed thru the hair about the ears, in positioning the mounting on the face of the wearer.

By this construction, it will be seen that the rear half of the temple is formed considerably heavier than the forward half thereof, whereby this rear heavier portion will counterbalance in a measure the weight of the lens frames attached thereto. Then again, it will be noted that when this heavier rear end portion extends over and beyond the ears of the wearer that the ears serving as a fulcrum point, as illustrated at $a$, in Fig. 7, will have a tendency to counterbalance the weight of the lens frames and reduce the pressure or weight of these lens frames to the minimum when in position on the nose of the wearer.

By forming my improved temple in three parts the same is very practical to construct and the rear portion which is formed larger where it engages the tender skin about the ears serves to prevent abrading the same and at the same time the weight of this portion is increased by the winding of the wire thereon and this winding also renders increased flexibility and yieldability of these ends. Also by forming a bendable and pliable core within this wound portion the shape of these ends may be bent to fit and properly engage the skull of the wearer.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In an ophthalmic mounting, a lens frame, a temple pivoted at its forward end to said frame and having an ear engaging portion intermediate its ends with its rear end extending a substantial distance beyond the ear engaging portion, the portion of said temple from the ear engaging portion to the rear end being of a weight substantially that of the forward portion of the temple and the lens frame whereby the lens frame and forward portion of the temple are substantially counterbalanced about the ear as a fulcrum when worn.

2. In an ophthalmic mounting, a lens frame, a temple pivoted at its forward end to said frame and having an ear engaging portion intermediate its ends with its rear end extending a substantial distance beyond the ear engaging portion, the portion of said temple from the ear engaging portion to the rear end being wound with a layer of wire to increase its weight to assist in counterbalancing the weight of the frame and forward portion of the temple about the ear as a fulcrum.

3. A temple for ophthalmic mountings having a core portion at one end with a helically wound layer of wire along its length, a tip member secured to the end of said core portion, said tip member and a portion of said wound wire being flattened on both sides to a dimension less than the diameter of the temple to be more readily passed through the hair of the wearer.

4. A temple for ophthalmic mountings having a core portion at one end with a plurality of helically wound layers of wire along its length, a tip member secured to the end of said core portion, said tip member and a portion of the layers of said wound wire being flattened to more readily be passed through the hair of the wearer.

In testimony whereof I affix my signature.

JOHN N. NELSON.